US008527747B2

(12) United States Patent
Hintermeister et al.

(10) Patent No.: US 8,527,747 B2
(45) Date of Patent: Sep. 3, 2013

(54) FUTURE SYSTEM THAT CAN PARTICIPATE IN SYSTEMS MANAGEMENT ACTIVITIES UNTIL AN ACTUAL SYSTEM IS ON-LINE

(75) Inventors: Gregory R. Hintermeister, Rochester, MN (US); Tammy L. Van Hove, Elgin, MN (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 12/885,676

(22) Filed: Sep. 20, 2010

(65) Prior Publication Data

US 2012/0072916 A1 Mar. 22, 2012

(51) Int. Cl.
*G06F 1/24* (2006.01)
(52) U.S. Cl.
USPC ........................................................ 713/100
(58) Field of Classification Search
USPC .................................................. 713/1, 2, 100
See application file for complete search history.

(56) References Cited

U.S. PATENT DOCUMENTS

| 6,370,146 | B1 * | 4/2002 | Higgins et al. ................ 370/400 |
| 2002/0095230 | A1 * | 7/2002 | Bergo et al. ..................... 700/96 |
| 2004/0268004 | A1 | 12/2004 | Oakley |
| 2005/0097394 | A1 * | 5/2005 | Wang et al. ..................... 714/11 |
| 2006/0075399 | A1 | 4/2006 | Loh et al. |
| 2008/0163196 | A1 * | 7/2008 | Gimpl et al. .................. 717/174 |
| 2008/0168424 | A1 | 7/2008 | Mohindra et al. |
| 2009/0281782 | A1 * | 11/2009 | Bitar et al. ...................... 703/21 |

\* cited by examiner

*Primary Examiner* — Kim Huynh
*Assistant Examiner* — Alyaa Mazyad
(74) *Attorney, Agent, or Firm* — Matthew C. Zehrer

(57) ABSTRACT

Hardware configuration management is provided. A hardware configuration manager includes a proposed new hardware configuration item for an existing production environment and its hardware configuration management software. A completed detailed setup of the management of the proposed hardware configuration item is completed before the proposed hardware configuration item is available. The detailed setup includes at least configuring policies of the proposed hardware configuration item. The hardware configuration manager also comprises a device for preventing scheduled tasks from running until a predefined period following activation of a new hardware configuration item that has the completed detailed setup and the proposed hardware configuration item is mapped thereto.

13 Claims, 5 Drawing Sheets

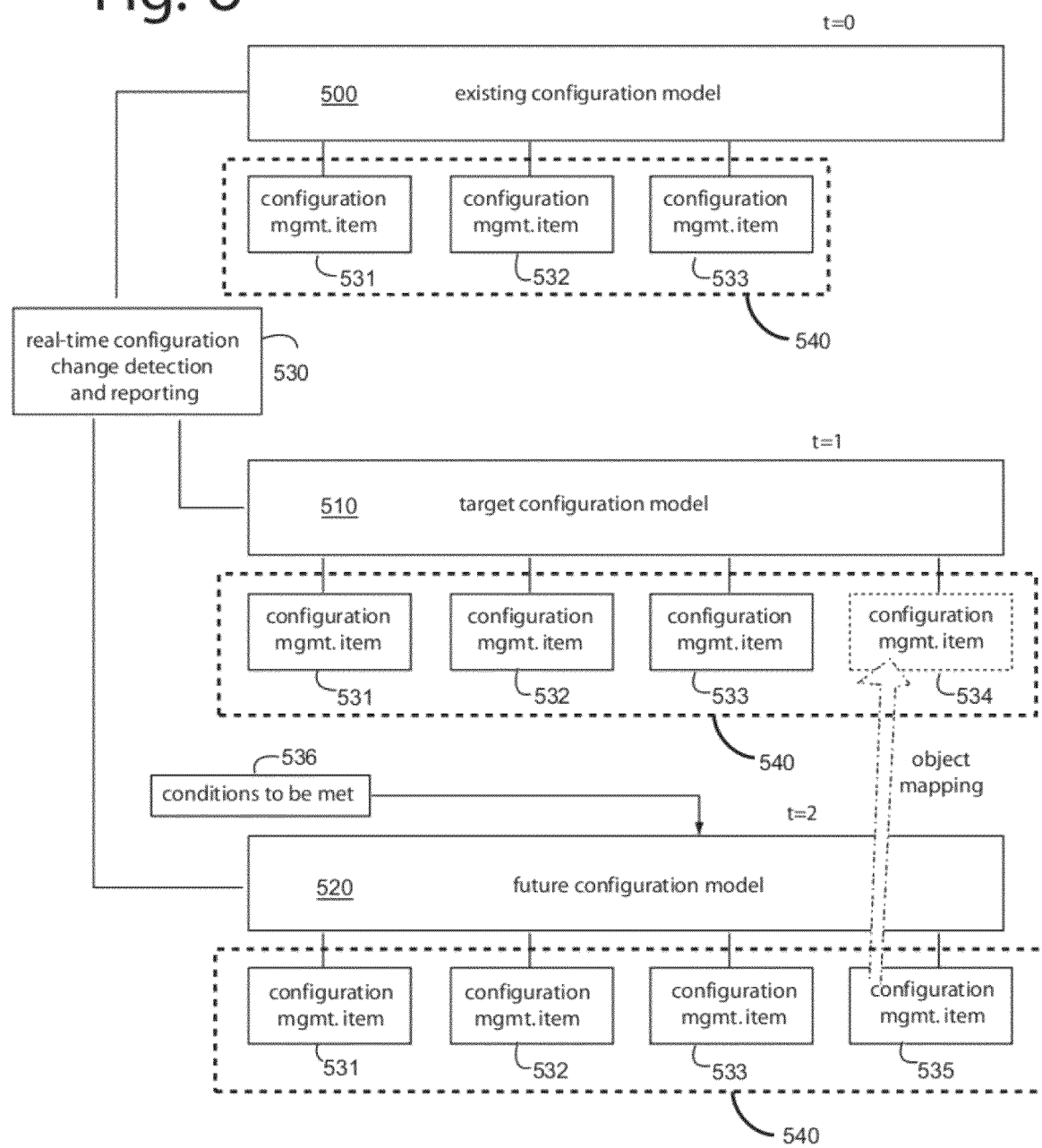

FUTURE SYSTEM THAT CAN PARTICIPATE IN SYSTEMS MANAGEMENT ACTIVITIES UNTIL AN ACTUAL SYSTEM IS ON-LINE

BACKGROUND OF THE INVENTION

1. Field of the Invention

The present invention relates to hardware configuration management, and more particularly, to a future system that can participate in automation, grouping, and other systems management activities until an actual system is on-line.

2. Background Information

By way of background, policy based automation solutions match workloads and resources to service level agreements. In automated data centers, the servers, networks, storage, and other resources are managed in pools, known as system or resource pools. Systems configuration management is used to match and schedule workloads and tasks on the available resources in the system pool. Health and availability monitors are used to detect when old resources drop out of the pool and new resources come on-line. As the system pool grows and evolves, new resources are added to the pool that can be scheduled to service more and more jobs.

In the past, the addition of a new resource in a system pool has meant that the configuration and detailed setup of the resource could not proceed until the resource was actually delivered and placed on-line. The configuration and detailed setup of the new resource would take place once the new resource was on-line in the system pool. As can be appreciated, systems management applications take some time to set up and fully manage a resource. In conventional systems, each newly added resource in a pool can require time and inject delays in regaining full system management, until the detailed setup of the new resource can be completed. This approach has often imposed substantial delays in getting the new resource up and running and potentially more delays before the resource was fully managed.

SUMMARY OF THE INVENTION

The foregoing problems are solved and an advance in the art is obtained by providing a future system that can participate in automation, grouping, and other systems management activities until an actual system is on-line. In cases where a new hardware configuration is planned, but the new hardware resources themselves are not yet delivered, the embodiments allow a detailed setup and the resulting new system configuration to be exercised and tested.

In one embodiment, a method of hardware configuration management. The method of hardware configuration management comprises adding a proposed new hardware configuration item for an existing production environment and its hardware configuration management software, and completing a detailed setup of the management of the proposed hardware configuration item before the proposed hardware configuration item is available to the production environment. The method also includes preventing tasks from running on the proposed hardware configuration item until a predefined period following activation of a new hardware configuration item that has the detailed setup completed and the proposed hardware configuration item is mapped thereto.

In another embodiment, a hardware configuration manager. The hardware configuration manager comprises a proposed new hardware configuration item for an existing production environment and its hardware configuration management software, and a completed detailed setup of the management of the proposed hardware configuration item before the proposed hardware configuration item is available, the setup including at least configuring policies of the proposed hardware configuration item. The hardware configuration manager also comprises a device for preventing scheduled tasks from running until a predefined period following activation of a new hardware configuration item that has the completed detailed setup and the proposed hardware configuration item is mapped thereto.

In another embodiment, a method of hardware configuration management. The method of hardware configuration management comprises adding a proposed new hardware configuration item to an existing production environment and its hardware configuration management software, and completing a detailed setup of the management of the proposed hardware configuration item before the proposed hardware configuration item is available to the production environment, the setup includes at least one of configuring monitoring and policies of the proposed hardware configuration item. The method of hardware configuration management also comprises preventing scheduled tasks from running until a predefined period following activation of an actual new hardware configuration item that has the placeholder stub added and the detailed setup completed.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which:

FIG. 5 is a functional block diagram showing three phases of configuration management in transitioning from an existing configuration model, through planned target configuration model, and finally to an intended configuration model.

DESCRIPTION OF THE PREFERRED EMBODIMENTS

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Described herein is a method of hardware configuration management. In the method, a proposed new hardware configuration item is added to an existing production environment and its hardware configuration management software, to complete a detailed setup of the management of the proposed hardware configuration item, before the proposed hardware configuration item is available to the production environment. The method also prevents tasks from running on the proposed hardware configuration item until a predefined period following activation of a new hardware configuration item.

In one embodiment, a method of hardware configuration management. The method of hardware configuration management comprises adding a proposed new hardware configuration item for an existing production environment and its hardware configuration management software, and completing a detailed setup of the management of the proposed hardware configuration item before the proposed hardware configuration item is available to the production environment. The method also includes preventing tasks from running on the proposed hardware configuration item until a predefined period following activation of a new hardware configuration item that has the detailed setup completed and the proposed hardware configuration item is mapped thereto.

In another embodiment, a hardware configuration manager. The hardware configuration manager comprises a proposed new hardware configuration item for an existing production environment and its hardware configuration management software, and a completed detailed setup of the management of the proposed hardware configuration item before the proposed hardware configuration item is available, the setup including at least configuring policies of the proposed hardware configuration item. The hardware configuration manager also comprises a device for preventing scheduled tasks from running until a predefined period following activation of a new hardware configuration item that has the completed detailed setup and the proposed hardware configuration item is mapped thereto.

Figure 1:
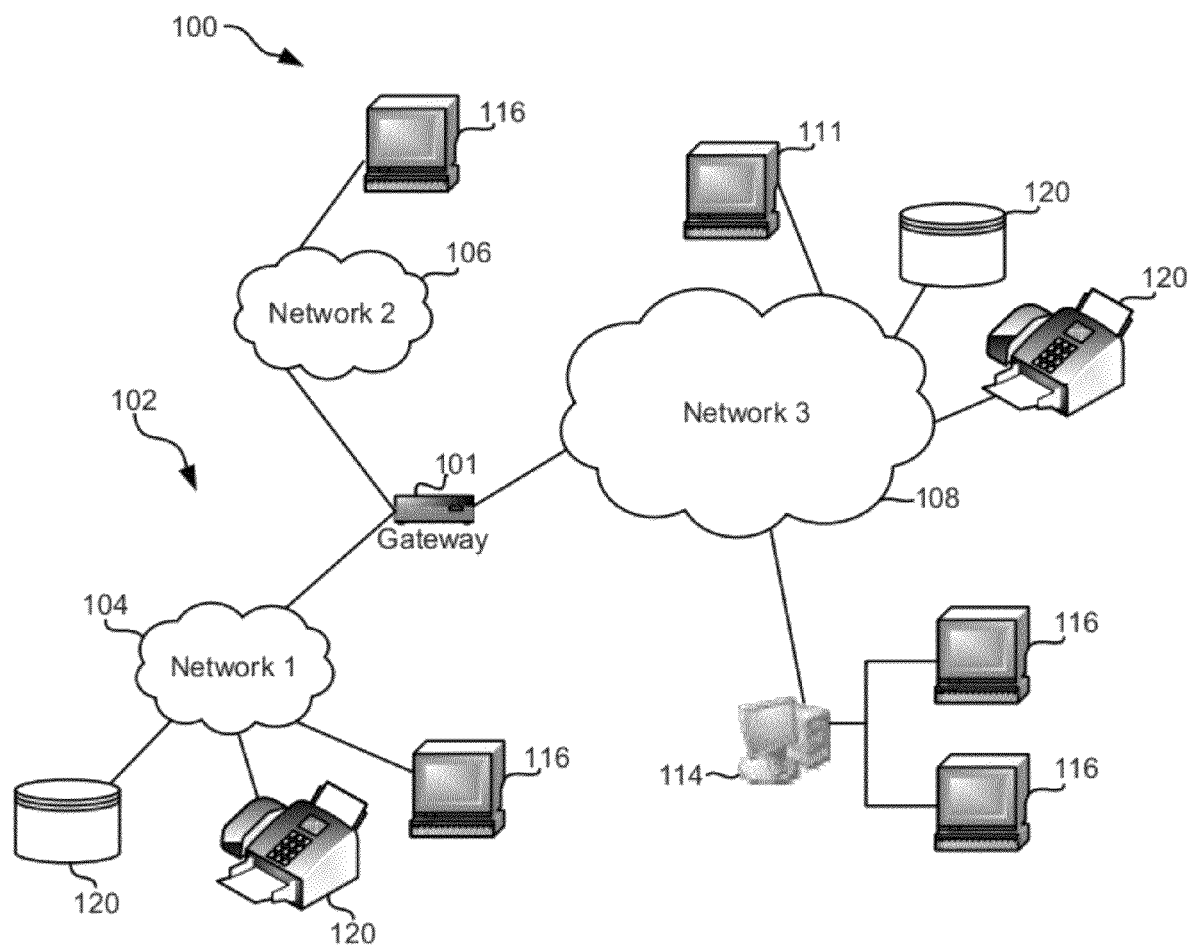
FIG. 1 illustrates a network architecture, in accordance with one embodiment.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 304, 106 may each take any suitable form including, but not limited to, a LAN, a WAN such as the Internet, PSTN, internal telephone network, etc.

Additionally, in the embodiments, the networks 104, 106 may take the form of any suitable dynamic computing environment. In one embodiment, the networks 104, 106 may take the form of a suitable dynamic computing environment, such as a computing cloud. In one embodiment, the networks 304, 106 may take the form of suitable as dynamic computing environments, such as private computing clouds.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic device. It should be noted that a user device 111 may also be directly coupled to any of the networks, in one embodiment.

A peripheral 120, or series of peripherals, which may comprise facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

Figure 2:
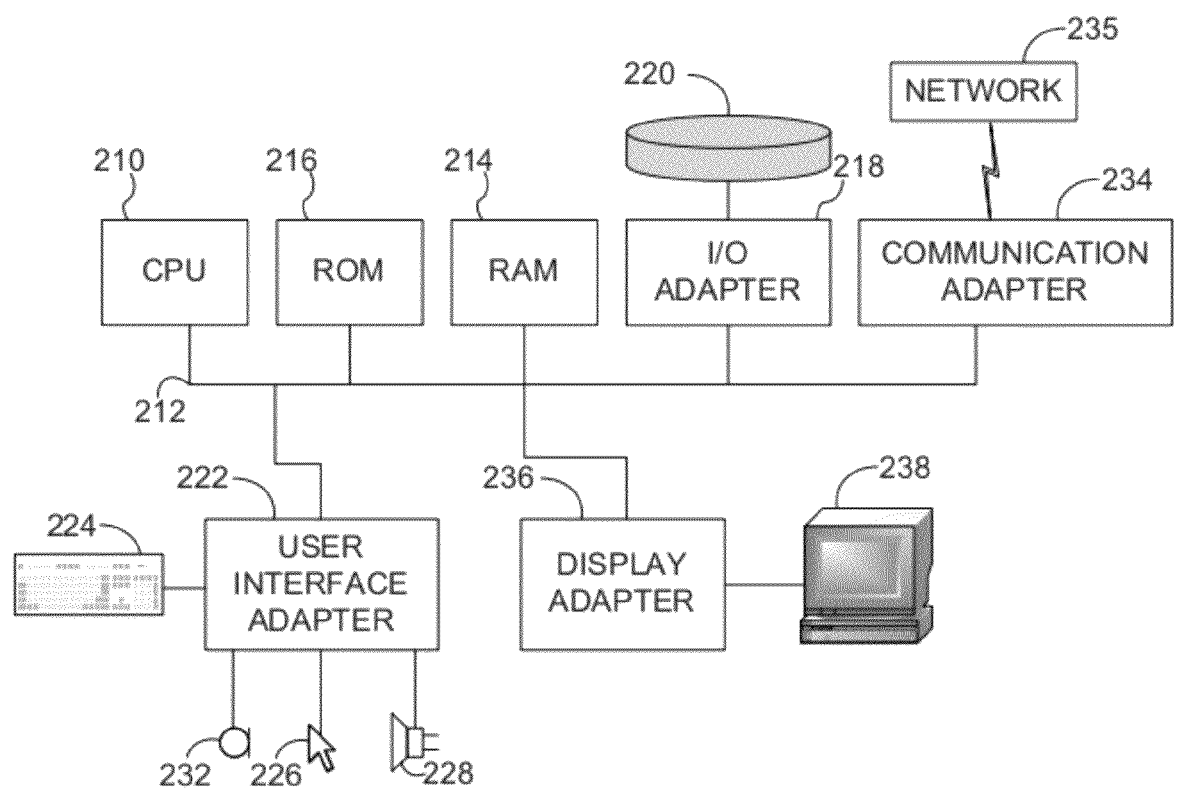
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. The Figure illustrates a typical hardware configuration of a user device, or workstation 116, and/or server 114 that may include a central processing unit 210, such as a microprocessor, and a number of other devices interconnected via a system bus 212.

The workstation 116 shown in FIG. 2 includes a Random Access Memory (RAM) 214, Read Only Memory (ROM) 216, and an I/O adapter 218 for connecting peripheral devices such as disk storage units 220 to the bus 212. The workstation 116 also includes a user interface adapter 222 for connecting a keyboard 224, a mouse 226, a speaker 228, a microphone 232, and/or other user interface devices such as a touch screen and a digital camera (not shown) to the bus 212, a communication adapter 234 for connecting the workstation to a communication network 235 (e.g., a data processing network), and a display adapter 236 for connecting the bus 212 to a display device 238.

The workstation 116 may have resident thereon an operating system capable of running various programs. It will be appreciated that a preferred embodiment may also be implemented on any suitable platform or operating system. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
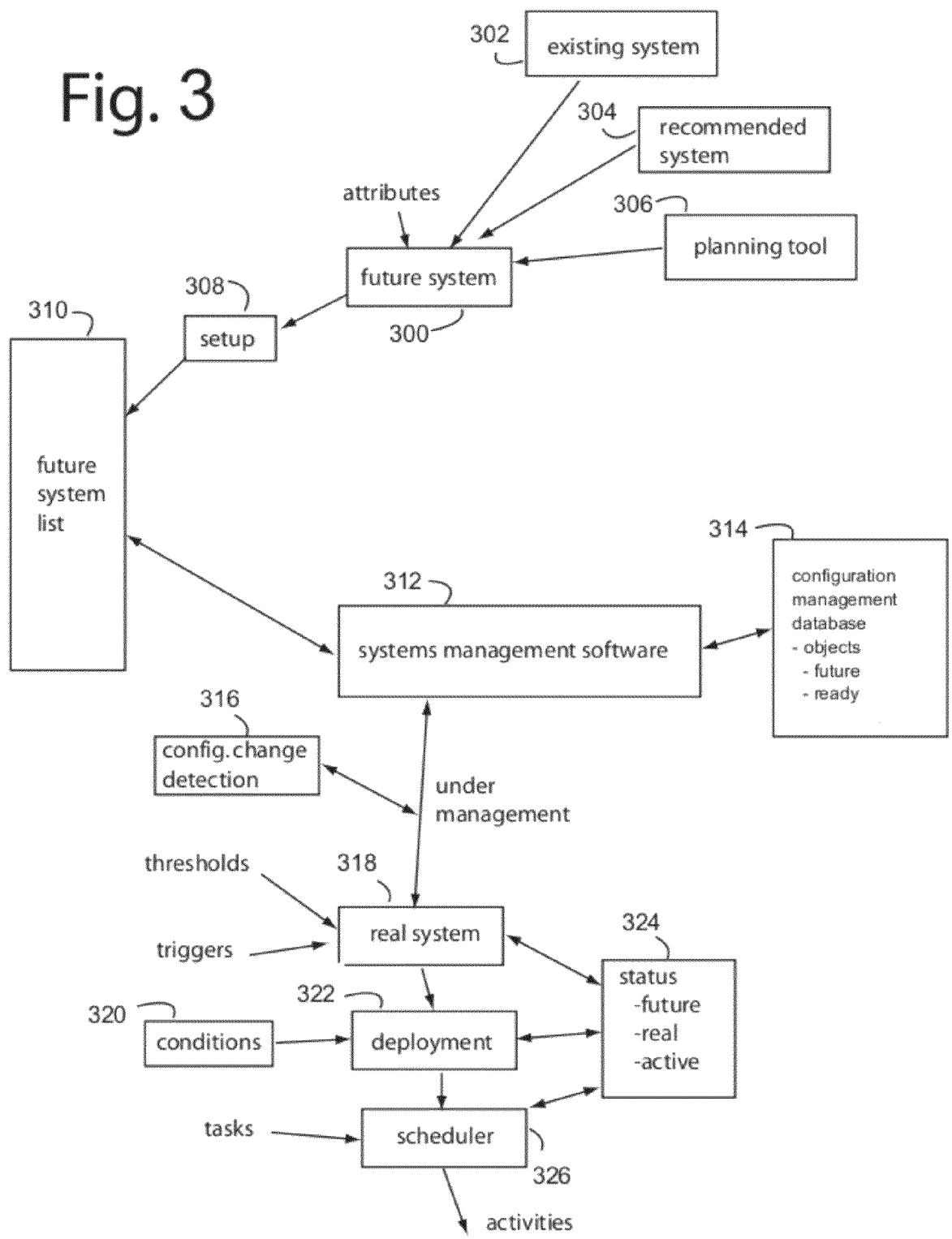
FIG. 3 is a functional block diagram showing a hardware configuration management system in accordance with the invention.

Referring now to FIG. 3, an embodiment of a systems configuration management comprises a future system 300. The future system 300 may be derived by a user from an existing system 302, from a recommended system 304 provided by a manufacturer, from a planning tool 306, or from other suitable sources. Although the future system 300 and its constituent pieces may not exist or may not have been delivered, the operational attributes of the future system 300 are often available and well-defined. The operational attributes of the future system 300 can include an operating system, hardware details, virtualization details, and other known and suitable attributes. Knowledge of the operational attributes of the future system 300 allow a detailed setup 308 of the future system 300 to be performed that may completely, or nearly completely, configure the future system 300 for scheduling activities and tasks. The detailed and configured future system 300, and others like it, can be added to a prepared inventory of future systems, such as a future system list 310. Many future systems 300 may be included by the future system list 310 and are distinguishable by their unique sets of attributes.

A systems management software 312 may actively manage the existing system 302 with a configuration management database 314 that includes objects that can be marked as future or ready. The future system list 310 may be stored in the configuration management database 314. A real-time configuration change detection and reporting service 316 can detect when a new, real system 318 comes on-line. The embodiments provide an ability to target a future system 300 into existing systems management software 312, so that the software 312 can be fully ready to manage the real system 318 when the system 318 comes on-line. The systems management software 312 looks in the future systems list 310 to see if a new real system 318 has been set up. Conditions-for-activation 320 can be added, so that when the real system 318 arrives, it may be held from going fully active until the conditions-for-activation 320 are met.

A system administrator can configure a future system 300 based on an existing system 302 or from a predefined list of templates, for example. The resulting future system 300 can then be added to automation plans, thresholds, inventory, scheduled tasks, and jobs that will be run its corresponding real system 318 once the real system comes on-line. Scheduling for those tasks can be conditioned by "when system comes on-line", for example, instead of a specific date. Future systems 300 can thereafter be included in any view that an administrator uses to manage the real systems 318, so the existing and near-term systems can be fully understood. Example administrator views include a health summaries, favorite systems, update policy targets, and so forth.

When the real system 318 appears and is discovered by the real-time configuration change detection and reporting service 316, the systems management software 312 automatically maps the real system 318 to the corresponding future system 300 in list 310 based on its unique attributes or on user input.

If a conditions-for-activation policy 320 is added, the real system 318 is held in a suspended state until the systems management software 312 determines that the conditions of the conditions-for-activation policy 320 have been be met. These conditions may include, for example, "bring real system on-line once dependent resources are ready"; "bring real system on-line once conditions xyz are met", or "bring real system on-line one only if the system can operate within certain energy limits"; among numerous other suitable conditions.

A deployment process 322 allows the actions and views to commence management of the real system 318. A status 324 of the newly activated real system 318 may then be advanced from "future", to "real", and then to "active" during the deployment process 322. A scheduler 326 may then allow tasks to schedule activities for the real system 318.

Figure 4:
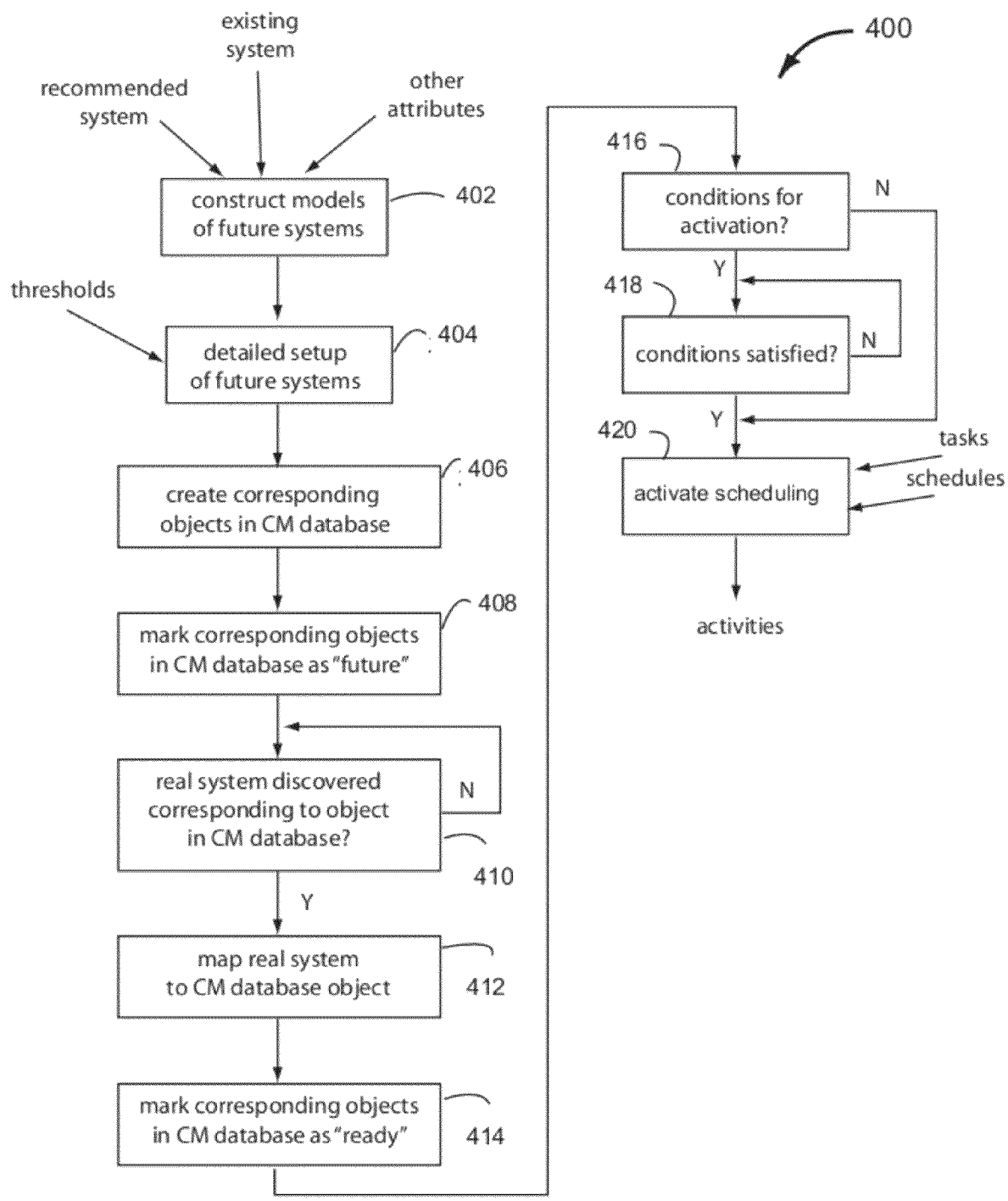
FIG. 4 is a flow diagram showing process for a hardware configuration management system.

Referring to FIG. 3 and FIG. 4, an embodiment of a configuration management method is shown generally at 400 in FIG. 4. Models of future systems 300 are constructed in step 402. A model of a future system 300 may be based on an existing system 302, by what a manufacturer recommends 304, or from planning tools 306, or other sources, for example. Future system attributes may include an operating system, hardware details, virtualization details, and other known and suitable attributes may be known and used in step 404 to perform a detailed setup of each future system 300. In step 406, "future" objects are created in the configuration management database 314. In step 408, each object's status is set to "future", and tasks can then be bound to them. Once tasks are available, they can be scheduled and configured based on the future objects.

Topology maps, lists in tables, property views, and so forth, can be included in the future systems 300 and resources such that their configurations can be complete, or nearly complete. Each future system 300 may have the ability to show how much processing and or memory would be available and at what date the future system 300 is available by using a "show available resources" tool. The deployment process 322 can be conditionally scheduled, such as "one day after date first on-line", for example. Activities can be scheduled and launched only after the deployment 322 allows the real system 318 to come on-line.

If a future system 300 is created from an existing system 302, detailed thresholds like "CPU utilization" "file exists on /root/customer/mylog.txt", among many other possible thresholds, can be copied to the future system 300 from the existing system 302. A system cannot trigger events while it is in "future" status. Once the status of the system changes to "active" monitoring of thresholds can start and triggers will be generated when thresholds are exceeded. Other examples of what can be done are the use of parameters. One exemplary parameter may be specifying that the future system 300 must operate within certain energy limits before it can be activated.

Scheduled tasks are not allowed to run on a real system 318 until after the activation of the system 318. Thus, the future system 300 allows system management activities to begin immediately for a new system configuration, because there is an actual object, the future system 300, in the management software 312 to which tasks, schedules, and policies can refer. When the corresponding real system 318 is discovered by the real-time configuration change detection and reporting service 316, in step 410, the real system 318 is mapped to the configuration management database 314, in step 412, without creating new objects.

In step 414, the object status is changed from "future" to "ready" indicating that the real system 318 is ready. In step 416, a test is made to see if any conditions-for-activation that must be satisfied before the real system 318 is allowed to be fully activated. If there are conditions-for-activation of the real system 318, then at step 418 a test is performed to determine if the conditions-for-activation of the real system 318 have been satisfied. The test for determining if conditions for activation of have been met may include checking the status of storage configuration, verifying network redundancy, and other associated resources, and determining if all resources are all configured and validated and other conditions are satisfied. If it is determined at step 418 that the conditions-for-activation of the real system 318 have been satisfied, then at step 420 scheduling of tasks is activated on the real system 318.

Alternatively, if it is determined in step 416 that there are no conditions-for-activation that must be satisfied before the real system 318 is allowed to be fully activated, the method continues to step 420. At step 420 scheduling of tasks is activated on the real system 318.

Thus, the embodiments prevent detailed setup delays that would otherwise occur and system configuration management is continuous and uninterrupted. The embodiments may be useful in dynamic computing environments such as private computing clouds and grids among other dynamic computing environments. The embodiments allow system administrators to anticipate a future system 300 coming on-line that either replaces an existing system or participates in all the same activities in an existing system pool. The administrator need not wait until the new system is actually on-line and fully configured in order to setup the systems management software to manage it properly.

Once the real system 318 is on-line and the systems management software 312 discovers it, the software 312 scans the future systems list 310 to find a match. If it finds a direct match it automatically updates the future system 300 to the real system 318. No new objects are created in the configuration database 314 and the existing database objects are updated to real, not future. The updating of the system status is enough for any predefined tasks, automation, thresholds, to initiate without any further action by the user.

For future systems 300 that have a conditions-for-activation policy, the systems management software 312 delays fully activating all the tasks, until the conditions can be met. This is very important in cases where a system has to participate in a system pool. As referred to herein, in one embodiment, a system pool comprises a group of systems fully virtualized and that are capable of sharing workloads. If the system pool is limited to using a certain amount of energy, the new real system 318 is prohibited from being activated until the system pool has enough of a power margin to handle the new system's 318 energy requirements. Therefore, as soon as other systems can be optimized, the systems management software 312 automatically moves to activate the new system 318.

Referring to FIG. 5, there is shown an embodiment for transitioning an existing configuration model 500 for a data center, through a planned target configuration model 510, and to an intended future configuration model 520. A real-time configuration change detection and reporting service 530 catalogs and monitors the health of various resources such as configuration management items 531-533. The various configuration management items 531-533 comprise a system pool 540. Physical changes in the resource population of the system pool 540, i.e. removing or adding configuration management items 531-533, need to be incorporated in the configuration model so that virtual resource mapping and job scheduling function correctly.

The configuration management items 531-533 comprising the system pool 540 are provisioned and have detailed setups, testing, and jobs scheduled for them to support. The real-time configuration change detection and reporting service 530 recognizes configuration management items 531-533, comprising the system pool 540, as the status quo.

The planned target configuration model 510 anticipates provisioning of the system pool 540, represented by a future configuration management item 534. For example, the future configuration management item 534 can include storage modules, power supplies, buildings, cooling, network interfaces, and so forth. The embodiment allows a detailed setup of the future configuration management item 534 to proceed, but none of the scheduled tasks are allowed to run until sometime after activation of a new real hardware configuration item 535 in the pool 540. Such a future configuration management item, allows system management activities to begin immediately for a new system configuration, because there is an actual object, the future configuration management item 534, profiled by target configuration model 510 to which tasks, schedules, and policies can refer.

When the real hardware configuration item 535 is discovered by the real-time configuration change detection and reporting service 530, the real hardware configuration item 535 is mapped to the future configuration management item 534, without creating new objects, and the objects' status is changed from "future" to "ready". The actual new hardware configuration item 535 is activated and ready to receive tasks once its associated resources, storage configuration, network redundancy, etc., are configured and validated. Detailed setup delays that would otherwise occur are avoided and system configuration management is continuous and uninterrupted by a smooth transition to future configuration model 520. As such, the invented system would be useful in dynamic environments such as private computing clouds and grids.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method of hardware configuration management, comprising:
    creating an object within a configuration management database, the object corresponding to a future system for an existing production environment, the future system including new hardware in addition to existing hardware of an existing system for the existing production environment, the new hardware not yet part of the existing system, including:
        adding a proposed new hardware configuration item for an existing production environment and its hardware configuration management software;
        completing a detailed setup of the management of the proposed hardware configuration item before the proposed hardware configuration item is available to the production environment;
    marking the object within the configuration management database as being a future system that does not yet exist and not a ready system that currently exists;
    discovering a system that now exists and that corresponds to the object;
    in response to discovering the system that now exists and that corresponds to the object,
        marking the object as ready within the configuration management database; and
        preventing tasks from running on the proposed hardware configuration item until a predefined period following activation of a new hardware configuration item that has the detailed setup completed and the proposed hardware configuration item is mapped thereto.

2. The method of claim 1, further comprising:
using the new hardware configuration item in system management activities.

3. The method of claim 1, further comprising:
completing the detailed setup of the management of the proposed hardware configuration item includes at least configuring policies of the proposed hardware configuration item.

4. The method of claim 1, further comprising:
completing the detailed setup of the management of the proposed hardware configuration item includes configuring at least one of monitoring, automation, grouping, pooling, and scheduling of jobs of the proposed hardware configuration item.

5. The method of claim 1, further comprising:
activating system management activities of the new hardware configuration item comprising:
    transitioning a status of the new hardware configuration item from future to ready;
    determining if conditions for activation exist and if conditions for activation exist,
    determining if the conditions for activation have been met; and
    activating system management activities of the new hardware configuration item.

6. A hardware configuration manager, comprising:
a configuration management database including an object that is created as corresponding to a future system for an existing production environment, the future system including new hardware in addition to existing hardware of an existing system for the existing production environment, the object representing:
    a proposed new hardware configuration item for an existing production environment and its hardware configuration management software;
    a completed detailed setup of the management of the proposed hardware configuration item before the proposed hardware configuration item is available, the setup including at least configuring policies of the proposed hardware configuration item; and
a device to:
    mark the object within the configuration management database as being a future system that does not yet exist and not a ready system that currently exists;
    discover a system that now exists and that corresponds to the object;
    in response to discovering the system that now exists and that corresponds to the object,
        mark the object as ready within the configuration management database; and
        prevent scheduled tasks from running until a predefined period following activation of a new hardware configuration item that has the completed detailed setup and the proposed hardware configuration item is mapped thereto.

7. The manager of claim 6, further comprising:
a mechanism for using the new hardware configuration item in system management activities.

8. The manager of claim 6, further comprising:
the completed detailed setup of the management of the proposed hardware configuration item including configuring at least one of monitoring, automation, grouping, pooling, and scheduling of jobs of the proposed hardware configuration item.

9. The manager of claim 6, further comprising:
a device for activating system management activities of the new hardware configuration item and for verifying that the new hardware configuration item has its associated resources ready, the device:
    transitioning a status of the new hardware configuration item from future to ready;
    determining if conditions for activation exist and if conditions for activation exist,
    determining if the conditions for activation have been met; and
    activating system management activities of the new hardware configuration item.

10. A method of hardware configuration management, comprising:

creating an object within a configuration management database, the object corresponding to a future system for an existing production environment, the future s stem including new hardware in addition to existing hardware of an existing system for the existing production environment, the new hardware not yet part of the existing system, including:
adding a proposed new hardware configuration item to an existing production environment and its hardware configuration management software;
completing a detailed setup of the management of the proposed hardware configuration item before the proposed hardware configuration item is available to the production environment, the setup includes at least one of configuring monitoring and policies of the proposed hardware configuration item;

marking the object within the configuration management database as being a future system that does not yet exist and not a ready system that currently exists;
discovering a system that now exists and that corresponds to the object;
in response to discovering the system that now exists and that corresponds to the object,
marking the object as ready within the configuration management database; and
preventing scheduled tasks from running until a predefined period following activation of an actual new hardware configuration item that has the placeholder stub added and the detailed setup completed.

11. The method of claim 10, further comprising:
using the new hardware configuration item in system management activities.

12. The method of claim 11, further comprising:
completing the detailed setup of the management of the proposed hardware configuration item further includes configuring at least one of automation, grouping, pooling, and scheduling of jobs of the proposed hardware configuration item.

13. The method of claim 10, further comprising:
activating system management activities once the new hardware configuration item once its associated resources are verified as ready.

* * * * *